United States Patent [19]

Busse et al.

[11] 3,911,374

[45] Oct. 7, 1975

[54] TRANSDUCER CONTROLLED OSCILLATOR SYSTEM

[75] Inventors: Wolfgang Busse, Schwieberdingen; Hans-Christoph Du Mont, Renningen; Winfried Klötzner, Munchingen; Erwin Gloss, Korntal; Rolf Däumer, Merklingen, all of Germany

[73] Assignee: Robert Bosch G.m.b.H., Gerlingen Schillerhöhe, Germany

[22] Filed: Sept. 9, 1974

[21] Appl. No.: 504,053

[30] Foreign Application Priority Data

Oct. 2, 1973 Germany ............................ 2349442

[52] U.S. Cl. ................ 331/65; 73/362 AR; 331/66; 331/111; 331/143; 331/177 R

[51] Int. Cl.$^2$... G01K 7/24; H03K 1/16; H03K 3/02

[58] Field of Search ............ 331/65, 66, 111, 177 R, 331/143; 73/362 R, 362 AR, 362 SC; 307/310; 328/3; 340/228 R

[56] References Cited

UNITED STATES PATENTS

| | | | |
|---|---|---|---|
| 3,308,667 | 3/1967 | Pearlman | 331/66 X |
| 3,656,066 | 4/1972 | Reynal | 331/177 R X |

*Primary Examiner*—Siegfried H. Grimm
*Attorney, Agent, or Firm*—Flynn & Frishauf

[57] ABSTRACT

A transducer with variable resistance is connected in the charge-discharge circuit of a capacitor. The voltage at the junction of the capacitor and the transducer of variable resistance is compared with a reference and, depending upon whether the voltage is above, or below the reference, a digital 1-signal, or 0-signal is provided; the change-over rate, or pulse repetition rate of switching between 0 and 1 values is determined by a timing circuit, for example from a pulse supply of fixed clock rate, so that the pulse repetition rate will be representative of resistance of the transducer, and will change with change in the transducer resistance value.

11 Claims, 1 Drawing Figure

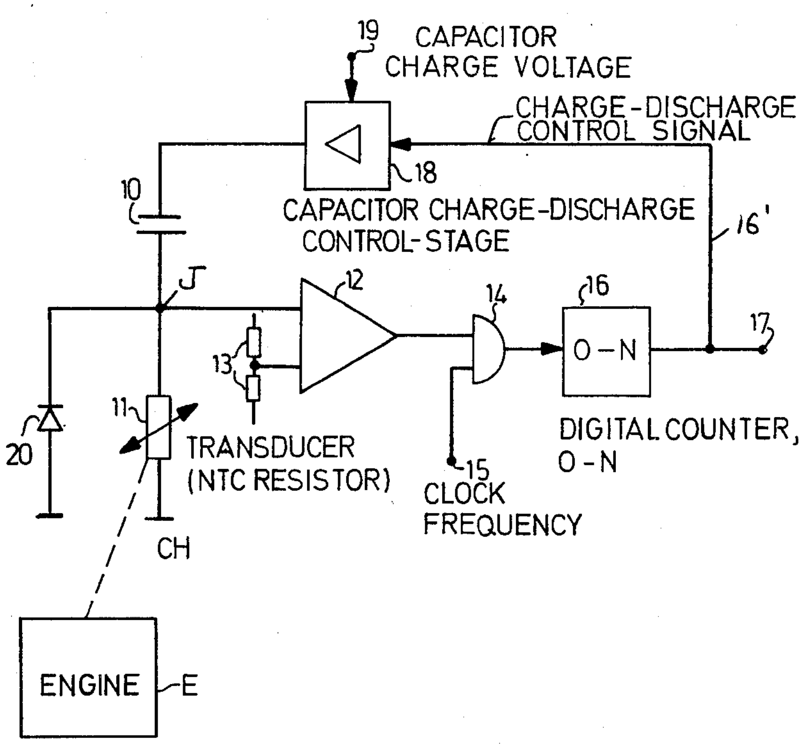
19
CAPACITOR
CHARGE VOLTAGE
CHARGE-DISCHARGE
CONTROL SIGNAL
18
CAPACITOR CHARGE-DISCHARGE
CONTROL-STAGE
10
16'
J
12
14
16
O – N
17
13
11
20
TRANSDUCER
(NTC RESISTOR)
15
CLOCK
FREQUENCY
DIGITAL COUNTER,
O – N
CH
ENGINE
E

TRANSDUCER CONTROLLED OSCILLATOR SYSTEM

The present invention relates to an oscillator system in which the frequency or pulse rate of the oscillator is controlled by a transduced value or parameter, and more particularly to a system in which an output pulse frequency or pulse repetition rate (PRR) will depend on a sensed temperature.

In many applications it is necessary to accurately determine temperature levels. Particularly, in internal combustion engines using fuel injection systems, which are digitally controlled, a temperature-dependent input signal in the form of a variable frequency is needed. The usual type of temperature transducer or sensing element is a negative temperature coefficient (NTC) resistor, located in heat-conductive relationship to the particular component or element of the engine, the temperature of which is to be sensed.

It is difficult to use known oscillator circuits for such an application. In many transducer systems, the actual transducer element is connected to chassis or ground, with one terminal. Effectively, only one, or "positive" terminal is available from which an insulated wire can be connected to the oscillator as such. Most transducers in automotive vehicles are attached by metallic connectors to the engine or vehicle frame so that, necessarily, one terminal of the NTC resistor is at ground or chassis potential. Many known oscillator circuits do not permit control of the frequency, or PRR of the oscillator, if only one active terminal of the control element can be connected to the oscillator itself.

It is an object of the present invention to provide an impedance controlled oscillator, and more particularly an oscillator which is controllable by the resistance of a transducer element, such as an NTC resistor, so that a temperature-dependent output frequency can be derived from the oscillator system; the oscillator should be simple, inexpensive, sturdy, and reliable, function under conditions of fluctuating supply voltage, and require but one connection lead from the transducer to the oscillator itself, the other terminal being formed by ground or chassis.

SUBJECT MATTER OF THE PRESENT INVENTION

Briefly, a capacitor is provided, charged over the transducer of variable impedance, typically an NTC resistor. A threshold circuit is provided in which, depending on the charge state of the capacitor, a timing frequency, such as a fixed clock frequency, is applied to the output, preferably over a frequency divider, or digital counter having a predetermined number of count states and then re-setting, the output from the oscillator being fed back to a charge-discharge circuit for the capacitor to control the charge, or discharge mode of connection to the capacitor thereby.

In accordance with a feature of the invention, the digital divider, or pulse counter, is connected between the threshold circuit and the input of the clock frequency source.

The invention will be described by way of example with reference to the accompanying drawing, wherein the single FIGURE is a highly schematic block diagram illustrating the transducer-oscillator system applied to provide an output frequency as a function of the temperature of an internal combustion engine.

The notation customary in digital technology will be used; a 0-signal is present when a voltage at the respective conductor or junction is at the approximate level of ground or chassis; a 1-signal is present when the voltage at the respective connection, junction or wire has the approximate value of the supply voltage, or a predetermined voltage used in the digital system.

The transducer element itself is an NTC resistor 11 connected between a junction J and ground, or chassis CH. The transducer 11 is in temperature-conductive or temperature-sensing relation to an internal combustion engine E. A charge capacitor 10 is connected in series between a capacitor charge-discharge control stage 18 and the junction J. The transducer 11 will, therefore, have only a single wire or lead connecting from the transducer 11 to the junction J, the other terminal of the transducer 11 being connected to chassis. The junction J between the capacitor 10 and the transducer resistor 11 is connected to one input of a comparator stage 12. The other input of the comparator which, typically, is an operational amplifier, is placed at a fixed or reference voltage, for example by being connected to a predetermined tap or division point of a voltage divider 13. Comparison is obtained by balancing the voltage at junction J with the reference voltage from the voltage divider 13. When the capacitor 10 exceeds a predetermined charge state, the temperature-dependent resistor 11 will have only a low charge current flow therethrough, so that the voltage drop across the transducer resistor 11 becomes less than the fixed reference voltage derived from voltage divider 13. The output of the comparator 12 will then have a 1-signal. If the charge current through capacitor 10 is high, the voltage drop across resistor 11 will be high and the output from the comparator 12 will be a 0-signal. Clearly, the voltage at junction J will, additionally, be affected by the resistance value of resistor 11.

The output of comparator 12 is connected to one input of an AND-gate 14. The other input of the AND-gate 14 has a clock frequency applied thereto from a terminal 15, forming a clock frequency source. The clock frequency, which acts as a timing frequency, is passed by the AND-gate 14 through the AND-gate so long as the output of comparator 12 has a 1-signal. The output from the AND-gate 14 is applied to the input of a digital counter 16, functioning as a frequency divider. The counter 16 reduces the clock frequency from clock 15 by a predetermined factor N. When a 1-signal is applied from comparator 12 to the AND-gate 14, the clock signal from source 15 first sets the counter 16 to zero, then causing the counter to count N pulses. During this count of N pulses, the output 17 from counter 16 will have a 0-signal thereat. After N pulses have been counted, the output at terminal 17 changes to a 1-signal. The digital counter 16 may be of any suitable construction. Terminal 17 forms the output terminal of the oscillator system and is, additionally, connected by a feedback line 16' to the control input of the capacitor charge-discharge control stage 18. The charge-discharge control stage 18 is supplied with charge voltage from a terminal 19 which, preferably, is connected to a voltage controlled supply. The charge-discharge control stage 18 may, in its simplest form, be an amplifier. Upon application of a control voltage over line 16', charge current is applied from terminal 19 to the capacitor 10, provided the signal level at line 16' is a 1-signal. If the signal is a 0-signal, the capacitor 10 can discharge through a suitable discharge resistor in the stage 18. Discharge resistors are available in most amplifiers, for example in push-pull output stages of an amplifier contained in the charge-discharge control stage 18. A separate discharge resistor may also be provided, separately switched by a suitable switching transistor in stage 18, and connected in parallel with capacitor 10 when the signal on line 16' changes to a 0-signal.

Also a separate discharge diode 20 may be connected in parallel with capacitor 10.

OPERATION:

The resistance of the transducer, that is, the resistance of the NTC resistor 11 is determined by the temperature of engine E. Let it be assumed that the capacitor 10 is discharged, and that the output 17 and hence line 16' will have a 1-signal appear thereat. Charge current will be applied to the capacitor 10. The voltage drop at the temperature-dependent resistor 11 will become greater than the reference voltage as determined by voltage divider 13. The comparator stage 12 will then have a 0-signal thereat, AND-gate 14 will block and the output on terminal 17 from stage 16 will retain the 1-signal. This causes the capacitor 10 to continue to charge over the charge control stage 18. The voltage drop at the temperature-dependent resistor 11 will become less and less until the output of the comparator stage 12 will again have a 1-signal appear thereat, resetting the output of the frequency divider 16 to a 0-signal, permitting the capacitor to discharge. If, due to temperature changes of engine E, the resistance of the NTC resistor 11 changes, the charge time of capacitor 10 will change. The 1-signal at terminal 17 will remain for a predetermined period of time, which time, in turn, controls the charge duration of the capacitor 10. This time, which is the pulse period, or pulse length of the 1-signals at terminal 17 controls the pulse length of the 1-signals and, of course, of the pulse gaps corresponding to the 0-signals at the output of the system, that is, terminal 17. The length of time of the 1-signals and the 0-signals, and their relative repetition rate thus depends on the charge duration and hence on the temperature of the temperature-dependent resistor 11.

Any other type of threshold circuit may be used, and it is not necessary that the threshold circuit be constructed as a comparator including an operational amplifier and a reference voltage, as shown. Various other changes and modifications may be made within the scope of the invention concept.

We claim:

1. Transducer controlled oscillator system having an output which changes between discrete values at a repetition rate depending on change in resistance of the transducer (11) in response to changes of a condition characterized by a capacitor (10);

a capacitor charge-discharge control stage (18) connected to one terminal of the capacitor, the transducer (11) being connected with one terminal to the other terminal of the capacitor;

a threshold sensing circuit (12, 13) connected to sense the charge state of the capacitor and providing an output sensing signal of two discrete values (0, 1) in dependence on the relation of said charge state with reference to a predetermined threshold;

means (14, 16) including a clock pulse supply (15) timing the duration during which the output from the threshold sensing circuit (12, 13) is at one of the respective discrete values (0, 1) to form an output of the oscillator system and changing between said values;

and means (16') connecting a signal representative of said output and derived therefrom to the charge-discharge control stage (18) to control said stage to provide charging current to the capacitor when the output signal has one discrete value (1) and to discharge the capacitor when the output signal has the other discrete value (0) so that, depending on the relative value of the resistance of the transducer (11), the threshold level of the threshold sensing circuit (12, 13) will be reached at different instants of time during the charging-discharging cycles of the capacitor and the output signal from the oscillator will change between the discrete values with different change-over rates, thereby providing a signal, the frequency of which varies as said condition, and hence the resistance of the transducer varies.

2. System according to claim 1, wherein the timing means comprises a counter stage (16) counting the clock pulses derived from the clock pulse source (15) to a predetermined number (N), the counter stage having a digital output changing between discrete values (0, 1) in dependence on whether the counter stage is counting, or has completed its count.

3. System according to claim 1, wherein the timing means comprises a frequency divider (16) dividing the clock pulses derived from the clock pulse source (15) at a predetermined rate (N), the frequency divider (16) having a digital output changing between discrete values (0, 1) in dependence on whether the counter stage is counting, or has completed its count.

4. System according to claim 3, wherein the frequency divider (16) is connected between the clock frequency source (15) and the output terminal (17) of the oscillator system.

5. System according to claim 1, wherein the transducer's (11) other terminal is connected to ground, or chassis connection (CH).

6. System according to claim 1, wherein the threshold circuit comprises a reference source (13) and a comparator connected to compare the voltage at the junction (J) of the transducer (11) and the capacitor (10) with the reference voltage of the reference source.

7. System according to claim 1, wherein the threshold circuit comprises a reference source (13) and a comparator connected to compare the voltage drop across the transducer with respect to the reference.

8. System according to claim 1, wherein the transducer is an NTC resistor (11).

9. System according to claim 2, wherein the timing means further comprises an AND-gate (14) having the output of the threshold circuit (13) and the clock pulse source (15) applied thereto and providing its output to the counter stage (16).

10. System according to claim 3, wherein the timing means further comprises an AND-gate (14) having the output from the threshold circuit (12, 13) and from the clock pulse source (15) applied thereto and providing its output to the frequency divider (16).

11. In an automotive vehicle, a temperature sensing system having an NTC resistor (11) located in temperature sensing relation to a component of the automotive vehicle, an oscillator system according to claim 2, and wherein the NTC resistor forms the transducer (11).

* * * * *